United States Patent [19]

Yokelson et al.

[11] Patent Number: 5,589,543
[45] Date of Patent: Dec. 31, 1996

[54] POLYURETHANE ELASTOMERS PREPARED FROM DIFUNCTIONAL TELECHELIC LINEAR NON-CROSSLINKED POLYOLEFINS

[75] Inventors: Howard B. Yokelson; Philip O. Nubel, both of Naperville; Raymond T. Behrends, Lombard, all of Ill.

[73] Assignee: Amoco Corporation, Chicago, Ill.

[21] Appl. No.: 563,197

[22] Filed: Nov. 27, 1995

Related U.S. Application Data

[63] Continuation-in-part of Ser. No. 3,536, Sep. 11, 1995, and a continuation-in-part of Ser. No. 68,236, May 27, 1993, Pat. No. 5,403,904, and a continuation-in-part of Ser. No. 68,240, May 27, 1993, Pat. No. 5,519,101, and a continuation-in-part of Ser. No. 167,668, Dec. 15, 1993, Pat. No. 5,512,635.

[51] Int. Cl.$^6$ .................. C08L 75/14; C08G 18/69
[52] U.S. Cl. .................. 525/131; 525/293; 526/312; 528/75; 528/84; 528/85; 528/904
[58] Field of Search .................. 525/131, 293; 526/312; 528/75, 84, 85, 904

[56] References Cited

U.S. PATENT DOCUMENTS

| | | | |
|---|---|---|---|
| 2,877,212 | 3/1959 | Seligman et al. | 528/75 |
| 3,308,170 | 3/1967 | Pritchett et al. | 528/75 |
| 3,427,366 | 2/1969 | Verdol et al. | 525/131 X |
| 3,758,426 | 9/1973 | Boivin et al. | 525/131 X |
| 3,897,386 | 7/1975 | Sanda, Jr. | 525/131 |
| 4,020,125 | 4/1977 | Suzuki et al. | 525/131 X |
| 5,266,145 | 11/1993 | Duck et al. | 525/131 X |
| 5,272,204 | 12/1993 | Akimoto et al. | 525/131 X |

*Primary Examiner*—Fred M. Teskin
*Attorney, Agent, or Firm*—Wallace L. Oliver; William C. Clarke

[57] ABSTRACT

A hydrophobic polyurethane elastomer composition is disclosed containing a linear soft segment without pendant chain branched groups, wherein said polyurethane elastomer has a glass transition temperature (Tg) of less than −70° C. and a moisture uptake of less than 1.0 wt. % after 24 hours of immersion in water at 70° C., and wherein said polyurethane elastomer comprises at least one repeat unit containing said linear soft segment, which soft segment comprises a moiety derived from a polyol of the structure:

$$X-[CH=CH(CH_2)_n]_mCH=CH-X$$

wherein X is a hydroxyl-containing moiety selected from the group consisting of $-CH_2OH$, $-(CH_2)_8COO(CH_2)_pOH$ and $-COO(CH_2)_pOH$, wherein the functionality number of the terminal groups is 2.0, p is 2 to 12, n is 1 to 10, m is a number average value of up to 1000, and the weight of the polyol is from about 0.5 wt. % to about 99.5 wt. % of the resulting polyurethane elastomer.

11 Claims, No Drawings

POLYURETHANE ELASTOMERS PREPARED FROM DIFUNCTIONAL TELECHELIC LINEAR NON-CROSSLINKED POLYOLEFINS

This Application is a Continuation-in-Part of application Ser. No. 60/003,536 filed Sep. 11, 1995, application Ser. No. 08/068,236, filed May 27, 1993, now U.S. Pat. No. 5,403,904, application Ser. No. 08/068,240 filed May 27, 1993, now U.S. Pat. No. 5,519,101, and application Ser. No. 08/167,668 filed Dec. 15, 1993, now U.S. Pat. No. 5,512,635.

FIELD OF THE INVENTION

This invention relates to a novel class of hydrophobic polyurethane elastomers prepared from hydrophobic difunctional telechelic linear non-crosslinked polyolefins without pendant chain branched groups wherein the functionality number of the terminal groups is 2.0, the functional groups are other than vinyl groups, and the polyolefins are of the structure

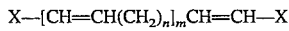

$$X\text{—}[CH\text{=}CH(CH_2)_n]_m CH\text{=}CH\text{—}X$$

wherein X is a hydroxyl-containing moiety, n is 1 to 10, and m is a number average value of up to 1000. X can be selected from the group consisting of —$CH_2OH$, —$(CH_2)_8COO(CH_2)_pOH$ and —$COO(CH_2)_pOH$, p is 2 to 12, and the weight of polyolefin constituent is from about 0.5 wt. % to about 99.5 wt. % of the hydrophobic polyurethane elastomers.

BACKGROUND OF THE INVENTION

It has now been found that polyurethane elastomers prepared from a hydrophobic difunctional telechelic linear non-crosslinked polyol without pendant chain branched groups of the above structure wherein the X's are hydroxyl-containing moieties such as —$CH_2OH$, —$(CH_2)_8COO(CH_2)_pOH$ and —$COO(CH_2)_pOH$ and permit the preparation of hydrophobic polyurethane elastomers with improved characteristics. Hydrolytic stability is improved. The effect of humidity aging on hardness, tensile strength, elongation, tear strength, hardness is significantly reduced. Low temperature flexibility of the resulting polyurethane elastomers prepared from the difunctional telechelic linear non-crosslinked polyol is significantly improved wherein glass transition temperature of the soft segment, Tg, is significantly lowered.

The difunctional telechelic linear non-crosslinked polyolefin without pendant chain branched groups wherein the X's are hydroxyl-containing moieties such as —$CH_2OH$, —$(CH_2)_8COO(CH_2)_pOH$ and —$COO(CH_2)_pOH$ is prepared by consecutive olefin metathesis reactions comprising an olefin metathesis reaction of an acyclic olefin with a linear terminal monofunctional group consisting of an ester moiety other than a vinyl group to prepare a linear terminal mono- or difunctional olefin wherein the functional groups are ester moieties of increased molecular chain length with other than terminal vinyl groups, and an olefin metathesis reaction of a linear terminal mono- or difunctional olefin with a cyclic olefin to prepare a linear terminal difunctional olefin of increased molecular chain length. The resulting linear terminal difunctional olefin wherein the functional groups are ester groups of increased molecular chain length has no pendant chain branched groups, and the molecular chain lengths are relatively uniform. The ester moiety is selected from the group consisting of an acrylate moiety, a methacrylate moiety, an allyl acetate, an undecylenate moiety, allyl propionate and allyl butyrate. Low molecular weight co-product olefins such as ethylene are removed from the olefin metathesis reactions by suitable means comprising evaporation, crystallization, purging the olefin metathesis reactions with an inert gas, and combinations thereof. The difunctional telechelic linear polyolefins wherein X is a hydroxyl moiety are prepared by conventional hydrolysis and alcoholysis reactions from the difunctional telechelic linear polyolefins wherein X is an ester moiety.

The resulting difunctional telechelic linear non-crosslinked polyolefin without pendant carbon groups, wherein the functional groups are ester moieties and have a 2.0 functionality number, are suitably substituted in conventional manner by reactive moieties selected from the group —$CH_2OH$, —$(CH_2)_8COO(CH_2)_pOH$ and —$COO(CH_2)_pOH$, wherein p is 2 to 12.

The polydispersity of this novel class of difunctional telechelic noncrosslinked polyolefins is from 1.3 to 3.0. The polyolefins are soluble in common organic solvents and demonstrate no evidence of pendant carbon chains with multiple carbon attachments under high resolution nuclear magnetic resonance (NMR).

The difunctional telechelic linear non-crosslinked hydrophobic polyolefins accordingly have unique physical properties because of their linearity, non-crosslinked structure, low polydispersity and unsaturation and are capable of providing these properties of linearity, non-crosslinking, low polydispersity, and hydrophobicity to polyurethane elastomers of high molecular weight. The absence of vinyl groups as reactive terminal moieties permits the preparation of high molecular weight linear hydrophobic polyurethane elastomers without branching of the polymer chains, thus permitting the preparation of high density polyurethane elastomers with less permeability to gas and solvents and increased tensile strength versus polyurethane elastomers with branched chains.

It is therefore an object of this invention to provide a new group of polyurethane elastomers with improved properties prepared from difunctional hydrophobic telechelic linear non-crosslinked polyolefins.

SUMMARY OF THE INVENTION

Polyurethane elastomers containing hydrophobic difunctional telechelic linear non-crosslinked polyolefins without pendant chain branched groups wherein the functionality number of the terminal group is 2.0 have a unique combination of mechanical properties and moisture resistance upon humid aging. In thermoplastic polyurethane systems, elastomers of this invention have useful tensile strength, tear strength, rebound and abrasion resistance comparable to those obtained with commercially available elastomers under dry, as-molded, conditions. In cast systems, the polyurethane elastomers have mechanical properties that are improved over elastomers containing poly(oxypropylene) glycol. In humid aging studies on both thermoplastic polyurethane elastomers and cast polyurethane elastomers, the results showed that elastomers of this invention had improved moisture resistance, as measured by retention of physical properties, relative to polyurethane elastomers prepared from commercial polyether polyols.

DETAILED DESCRIPTION OF THE INVENTION

This invention relates to a hydrophobic polyurethane elastomer containing a linear soft segment without pendant chain branched groups, wherein said polyurethane elastomer has a glass transition temperature (Tg) of less than −70° C. and a moisture uptake of less than 1.0 wt % after 24 hours of immersion in water at 70° C., and wherein said polyurethane elastomer comprises at least one repeat unit containing said linear soft segment, which soft segment comprises a moiety derived from a polyol of the structure:

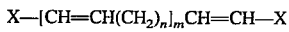

wherein X is a hydroxyl-containing moiety selected from the group consisting of —CH$_2$OH, —(CH$_2$)$_8$COO(CH$_2$)$_p$OH and —COO(CH$_2$)$_p$OH, wherein the functionality number of the terminal groups is 2.0, p is 2 to 12, n is 1 to 10, m is a number average value of up to 1000, and the weight of said polyol is from about 0.5 wt. % to about 99.5 wt. % of said polyurethane elastomer, and the said polyurethane comprises the reaction product of:

(i) the said polyol; and (ii) an isocyanate having a functionality of at least 2; and (iii) a chain extender selected from the group consisting of monomeric diols of from 2 to 20 carbon atoms and amines of from 2 to 20 carbon atoms.

Preparation of polyurethane elastomers of this invention can be by procedures conventional in the art for synthesis of polyurethane elastomers. Such procedures include the casting procedure in which the reactants are mixed in the liquid state, one-shot route or prepolymer technique, and the reacting mixture is then fabricated into its final form by an appropriate technique such as casting or molding, while the reaction continues by chain extension and/or cross-linking. Final cure is typically achieved by a hot air post-cure for up to twenty-four hours at 25° C. to about 200° C. In general, the reaction of the components, either all three components in the one-shot technique, or in the prepolymer technique, wherein the chain extender has been added and mixed with the prepolymer comprising the isocyanate and the polyol, limits the subsequent pot life to several minutes, and subsequent casting or molding immediately thereafter.

The equivalency ratios of isocyanate, polyol, and chain extender can be determined by the requirements of the application. Adjustment of the physical properties and processing characteristics of the polyurethane elastomer polymers is obtained by adjusting the amounts and ratios of the components. The weight of the polyol can be from about 0.5 wt. % to about 99.5 wt. % of the resulting polyurethane elastomer. Based on the hydroxyl value of the polyol, the amount of isocyanate to cause chain growth can be calculated by typical procedures. However, it has been found that when the functionality number of the terminal groups of the hydrophobic polyol is 2.0, the resulting polyurethane is a high molecular weight substantially linear system wherein the hydrolytic stability of the polyurethane elastomers is significantly improved. The negative change in physical properties of the polyurethane elastomer after exposure to conditions of humidity correlate with the amount of moisture absorbed by the polymer.

As will be apparent to one skilled in the art, the final physical properties of the elastomers of this invention may be altered considerably by altering the identity, stoichiometry and molecular weight of the species reacted. As such, the determination of a precise boundary between cured polymers made so as to exhibit elastomeric or plastic properties, is practically impossible. The amount of the reactants employed depends, inter alia, on the desired properties of the final cured polyurethane.

The polyurethane elastomers of the instant invention are prepared from hydrophobic difunctional telechelic non-crosslinked polyolefins without pendant chain branched groups wherein the functionality number of terminal groups is 2.0, the functional groups are other than vinyl groups, and the polyolefins are of the structure

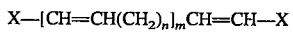

wherein X is a hydroxyl moiety, n is 1 to 10, and m is a number average value of up to 1000. X is selected from the group consisting of —CH$_2$OH, —(CH$_2$)$_8$COO(CH$_2$)$_p$OH, and —COO(CH$_2$)$_p$OH wherein p is 2 to 12. An example is 1,4-polybutadiene diol. These polyols are essential for the preparation of the polyurethane polymers of this invention as being hydrophobic and provide hydrophobicity to the polyurethane polymers resulting therefrom.

For example, when n is 2, the polyol is a 1,4-polybutadiene diol, when n is 3, the polyol is a poly(1-pentenylene)diol, when n is 4, the polyol is a poly(1-hexenylene)diol, when n is 6, the polyol is a poly(1-octenylene)diol, when n is 8, the polyol is a poly(1-decenylene)diol, and when n is 10, the polyol is a poly(1-dodecenylene)diol.

It is essential that the hydrophobic polyurethane elastomers contain at least one repeat unit which comprises a linear soft segment derived from a polyol defined as above, an isocyanate having a functionality of at least 2, and, optionally, a chain extender selected from the group consisting of monomeric diols of from 2 to 20 carbon atoms and amines of from 2 to 20 carbon atoms.

Physical properties of the polyurethane elastomer can be modified by use of a mixture of polyols of which at least one polyol is a hydrophobic difunctional telechelic linear non-crosslinked polyolefin without pendant chain branched groups wherein the functionality number of the terminal groups is 2.0, the functional groups are other than vinyl groups and the polyolefin is of the structure X—[CH=CH(CH$_2$)$_n$]$_m$CH=CH—X, wherein n, m and X are defined as above. At least one of the other polyols suitable in a mixture of two or more polyols to modify the properties of the resulting polyurethane can be a polyether, a polyester or a polyolefin polyol. The polyether polyol can be poly(oxypropylene)glycol, poly(oxyethylene)glycol, poly(oxypropyleneoxyethylene)glycol, poly(oxy-tetramethylene)glycol, poly(oxybutylene)glycol, or mixtures thereof. The polyester polyol can be poly(caprolactone)glycol, poly(ethyleneadipate)glycol, poly(butyleneadipate)glycol, aromatic polyester glycols, or mixtures thereof. The polyolefin polyol can be polybutadiene polyol, hydrogenated polybutadiene polyol, polyisoprene polyol, hydrogenated polyisoprene polyol, and mixtures thereof.

As is well-known, thermoplastic polyurethane elastomers are segmented linear polymers and can be based on 4,4'-methylene bis(phenyl)isocyanate (MDI), polyester or polyether glycols, and glycol extenders. In the prepolymer procedure, the isocyanate reacts with the polyol, and the chain extender, usually a monomeric diol such as 1,4-butanediol, or an amine, is added. Other hydroxyl-functional monomeric chain extenders are 1,6-hexanediol, ethylene glycol, dimethylolpropionic acid, hydroquinone dihydroxyethyl ether (HQEE), diethylene glycol, propylene glycol, trimethylolpropane, glycerol, and amines such as diethyltoluenediamine (DETDA), 4,4'-methylene bis(2-chloroaniline) (MBCA), ethylenediamine (EDA), dimethylthiotoluenediamine (DMTTDA), 4,4'-methylenedianiline (MDA), complex of methylenediamine with NaCl (MDA complex), trimethyleneglycol di-p-aminobenzoate (TMGDAB), 4,4'-methylene-bis(3-chloro-2,6-diethylaniline) (MCDEA), and N,N'-bis(sec-butyl)methylenedianiline (SBMDA). The chain extenders can be used singularly, in admixture with each other, and mixtures thereof.

It has been found that the preferred organic diisocyanates to be used for the preparation of polyurethane elastomer of this invention are those exhibiting several or all of the following characteristics: bulk, symmetry around the isocyanate functional groups, rigid, aromatic, crystalline and high purity. By way of example, but not limited to the following diisocyanates, are 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, and the like. The organic diisocyanates can be employed singularly, in admixture with each other, and mixtures thereof.

In polyurethane elastomers, it is commonly recognized that for good physical characteristics in use, it is preferred to have a soft segment having a glass transition temperature (Tg) well below the expected use temperature and a hard segment having a softening point or a melt temperature (Tm) well above the expected use temperature.

The soft segment of the polyurethane elastomer of this invention provides a glass transition temperature (Tg) of as low as −85° C. The hard segment provided by the chain extender can be selected to provide a melt temperature (Tm) well above the expected use temperature. Such selection can be made on the basis of ordinary laboratory experimentation.

The segmented polyurethane elastomers of this invention exhibit excellent physical properties typical of segmented polyurethane copolymers, as measured by ultimate tensile strength, elongation, modulus of elasticity and tear strength. The polymers of this invention may be cured by procedures conventional in the art for the curing of isocyanate terminated polymers. By way of example, but not limited to these procedures are use of moisture, blocked amines, oxazolidines, epoxies, triisocyanurate ring formation, allophonate and biruet crosslinking and the like. Dependent upon the curing technology employed, the resulting polyurethane elastomers may be either a thermoset polyurethane, or a higher melt temperature thermoplastic polyurethane once curing is accomplished.

As set forth above, the polyurethane elastomers of this invention were made by a batch procedure as herein described, but a continuous procedure can be utilized. The mixing of the reactants can be accomplished by any of the procedures and apparatus conventional in the art. Preferably, the individual components are urethane grade and, as such, have low moisture content or are rendered substantially free from the presence of water using conventional procedures, for example, by azeotropic distillation, or by heating under reduced pressure at a temperature in excess of the boiling point of water at the pressure employed. The later procedure is preferred to accomplish degassing of the components.

Both thermoplastic (TPU) and cast elastomers were prepared and characterized. The TPU's were prepared utilizing the one-shot method employing difunctional polybutadiene diols (DIFOL diols), MDI, and 1,4-butanediol. The DIFOL diols used are defined as of the structure $X-[CH=CH(CH_2)_n]_mCH=CH-X$ wherein n is 2 and m is a number average value of up to 1000, and wherein X is $-(CH_2)_8COO(CH_2)6-OH$. These TPU's were compared with elastomers prepared from poly(oxytetramethylene)glycols (PTMO), a commercial polybutadiene polyol and poly-(caprolactone)glycols (PCL). Cast elastomers were prepared from DIFOL polyols by the prepolymer method using TDI and 4,4'-methylene-bis(2-chloroaniline) (MBCA) as curative. A comparison of the properties of these cast elastomers was made with those prepared from poly(oxypropylene)glycol (PPG) and PTMO.

Special attention was focused on the evaluation of the thermal and moisture resistance properties of the DIFOL elastomers and their performance in comparison with elastomers prepared from commercial polyols, including polybutadiene-based polyol Poly-bd R-45HT (Atochem North America, Inc., Buffalo, N.Y.). The DIFOL-based elastomers had better tensile strength, tear strength, rebound and abrasion resistance than those obtained for Poly-bd elastomers. The polyurethane elastomers based on DIFOL diols exhibited excellent hydrolytic stability. Water uptake and retention of properties after immersion in water for several days at 70° to 100° C. were similar to those based on Poly-bd and far better than those based on PTMO.

The retention of properties after aging for seven days at 100° C. in air of DIFOL-based elastomers containing an antioxidant was very good. The glass transition temperature of the soft segments in elastomers based on DIFOL diols was very low (<−80° C.). The stress-strain properties of the polyurethane elastomers based on DIFOL diols were dependent on their molecular weight and the concentration of hard segments.

The performance of these of polybutadiene diols in both thermoplastic and cast polyurethane elastomers was evaluated relative to commercial polyols. The polybutadiene diols utilized are of the structure

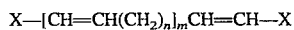

wherein X is a moiety as previously defined, and n and m are also as previously defined. The polybutadiene diol (DIFOL) is a purely difunctional, 1,4-polybutadiene polyol. The hydroxyl functionality is 2.0 and it contains only primary hydroxyl end-groups. The DIFOL polymer backbone consists entirely of a 1,4-polybutadiene microstructure without any 1,2-type repeat units. A commercial polybutadiene polyols can have a functionality greater than two (f=2.4–2.6), and contain a significant fraction of pendant vinyl groups as a result of 1,2-addition. The pendant vinyl groups can adversely affect low temperature performance by raising the glass transition temperature, Tg, and are more susceptible to thermo-oxidative degradation than unsaturation in the polymer backbone.

A series of thermoplastic elastomers based on Amoco DIFOL polybutadiene diols (2000, 3000, 5000, and 6000 MW) (Amoco Corporation, Chicago, Ill.), MDI and 1,4-butanediol were synthesized utilizing a one-shot synthetic procedure. For comparison, polyurethane elastomers were prepared from the commercial polyols, poly(oxytetramethylene)glycol (PTMO), and poly(caprolactone)glycol. Evaluation of hydrolytic and thermo-oxidative stability of the DIFOL-based elastomers was made versus that of the commercial polyol based elastomers. The oxidative stability of the DIFOL-based elastomers containing antioxidants was also evaluated. Tensile properties, tear strength, hardness, resilience, and compression set of the elastomers were measured. The evaluations employed differential scanning calorimetry (DSC) to measure Tg and Tm, thermo-mechanical analysis (TMA) to measure softening temperature, dynamic-mechanical analysis (DMA), to measure thermal transitions and scanning electron microscopy (SEM) to determine phase separation and domain structure.

Evaluation of cast polyurethane elastomers based on DIFOL 2000 was carried out. The elastomers were prepared by the prepolymer method using TDI (80|20 mixture of isomers) and 4,4'-methylene-bis(2-chloroaniline) (MBCA). Samples with two different hard segment concentrations were prepared by varying the initial NCO/OH ratio of the prepolymer (2/1 and 2.5/1). The properties of the elastomers were compared to those prepared from PPG 2010 and PTMO 2000 diols as described above for the thermoplastic systems.

All chemicals used in this study are listed in Tables 1 and 2. Polyols and chain extenders were dried under a vacuum of 1–3 mm Hg at 70° C. overnight prior to usage. Isocyanates were used as received from suppliers and the isocyanate content was determined by the di-n-butylamine method. The diglyme used in the reactivity study was dried over 4A molecular sieves for at least 24 hours prior to use. Cyanox 2246 (Cytec Industries, West Patterson, N.J.), was used as an anti-oxidant stabilizer for both DIFOL and Poly-bd elastomers.

Physical and mechanical properties of polyurethane elastomers were determined by the following test methods:

Shore hardness, ASTM D-2240-75.

Stress-strain behavior (tensile strength at break, ultimate elongation, 100% and 300% modulus), ASTM D-412-68.

Tear resistance, Graves die C (ASTM D-624-72), and Split tear (ASTM D-1938-67).

Compression set, ASTM-395-69, method B.

Resilience, Bashore rebound, ASTM D-430-73. TPU only.

Abrasion resistance (Taber Abrader).

Coefficient of linear thermal expansion. Cast only.

The moisture resistance of polyurethane elastomers was studied by immersion in water at 100° C. for seven days. The percentage of water absorption as well as the retention of properties (stress-strain properties, hardness, resilience, and split tear strength) were determined. For the cast elastomers, the immersion test to determine the percentage of water absorption was done at 70° C.

TABLE 1

Materials

| Designation | Chemical Identification | Eq./Wt | Structure | Sources |
| --- | --- | --- | --- | --- |
| POLYOLS | | | | |
| DIFOL 2000 | Polybutadiene diol | 1100 | 1,4-polybutadiene | Amoco Corporation |
| DIFOL 3000 | Polybutadiene diol | 1430 | 1,4-polybutadiene | Amoco Corporation |
| DIFOL 5000 | Polybutadiene diol | 2120 | 1,4-polybutadiene | Amoco Corporation |
| DIFOL 6000 | Polybutadiene diol | 2950 | 1,4-polybutadiene | Amoco Corporation |
| PIB-diol | Polyisobutylene diol | 1100 | HO—[C(Me)$_2$—CH$_2$]$_x$—OH | Amoco Corporation |
| R-45HT | Poly-bd polyol (f = 2.4–2.6) | 1160 | polybutadiene 80% 1,4- 20% 1,2- | Atochem |
| PPG 2010 | Poly(oxypropylene) glycol | 1005 | H—[OCH$_2$—CHMe]$_x$—OH | BASF |
| PTMO 2000 | Poly(oxytetra-methylene) glycol | 1000 | H—[O(CH$_2$)$_4$]$_x$—OH | DuPont |
| PTMO 2900 | Poly(oxytetra-methylene) glycol | 1450 | H—[O(CH$_2$)$_4$]$_x$—OH | DuPont |
| Tone 0240 | Poly(caprolactone) glycol | 1000 | H—[O—OC—(CH$_2$)$_5$]$_x$—OH | Union Carbide |
| ISOCYANATES and CHAIN EXTENDERS | | | | |
| 1,4-BD | 1,4-Butanediol | 45 | HO—(CH$_2$)$_4$—OH | GAF |
| Curene 442 | 4,4'-Methylene-bis (2-chloroaniline), or MBCA | 133.5 | H$_2$N—Ar—CH$_2$—Ar—NH$_2$ | Anderson Company |
| Mondur M | 4,4'-Diphenylmethane diisocyanate, or MDI | 125 | OCN—Ph—CH$_2$—Ph—NCO | Bayer |
| Mondur TD-80 | 2,4-(80%),2,6-(20%) Toluene diisocyanate, or TDI | 87 | CH$_3$—(C$_6$H$_3$)-(NCO)$_2$ | Bayer |
| Ph-Isocyanate | Phenyl isocyanate | 119 | C$_6$H$_5$—NCO | Aldrich |
| OTHER | | | | |
| Diglyme | 2-Methoxyethyl ether | | | Aldrich |
| T-12 | Dibutyltin dilaurate | | | Air Products |
| Cyanox 2246 | Anti-oxidant | | | Cytec |

TABLE 2

Data For AMOCO DIFOL and Other Hydrocarbon Polyols

| Sample Identification<br>Source | Units | DIFOL-<br>A2000<br>Amoco | DIFOL-<br>A3000<br>Amoco | DIFOL-<br>A5000<br>Amoco | DIFOL-<br>A6000<br>Amoco | PIB<br>A2000<br>Amoco | R-45<br>HT**<br>Atochem |
|---|---|---|---|---|---|---|---|
| Functionality | OH/chain | 2.0 | 2.0 | 2.0 | 2.0 | 1.8–2.0 | 2.5–2.6 |
| Molecular Weight | | | | | | | |
| Carbon NMR, Mn | | 2200 | 2910 | 5140 | 6490 | 2000 | |
| GPC vs. Polybutene Std | | | | | | | |
| Mn | | 2630 | 3160 | 4060 | 5530 | 1700 | 2800 |
| Mw | | 3720 | 4380 | 5720 | 8180 | 1860 | 6160 |
| Polydispersity, Mw/Mn | | 1.4 | 1.4 | 1.4 | 1.4 | 1.1 | 2.2 |
| End Group Analysis | | | | | | | |
| Hydroxyl Number | mg/KOH/g | 48.1 | 39.2 | 26.5 | 19.0 | 51.6 | 48.2 |
| Hydroxyl Value | meq./g | 0.858 | 0.698 | 0.473 | 0.339 | 0.919 | 0.86 |
| Hydroxyl Equivalent Wt. | g/Eq OH | 1170 | 1430 | 2120 | 2950 | 1090 | 1160 |
| Viscosity (25° C.) | | | | | | | |
| Gardner | | Z-1 | Z-3 | Z-5 | Z-7 | Z-10 | Z-5 |
| Brookfield | Poise | 33 | 64 | 88 | 332 | 5410 | 98 |
| Karl Fischer Water | ppm | 90 | 158 | 105 | 67 | 241 | 300 |
| Analysis | | | | | | | |
| Glass Transition | °C. | (−96) | (−95) | (−94) | (−95) | (−43) | (−76) |
| Temperature, Tg | | | | | | | |
| Reactivity with RNCO | | good | good | good | good | good | good |
| Compatibility with | | hazy | hazy | hazy | phased | clear | hazy |
| 1,4-butanediol at 70° C. | | | | | | | |

**Data from Atochem data sheet for comparison.

The oxidative stability of polyurethane elastomers was evaluated by measuring the retention of stress-strain properties and hardness after exposure to elevated temperature in a convection oven (VWR 1601) for seven days at 100° C.

The glass transition temperatures (Tg) were measured by differential scanning calorimetry (DSC) and dynamic mechanical analysis (DMA). The softening of polyurethane elastomers was measured by thermo-mechanical analysis (TMA). Domain structure was studied by scanning electron microscopy (SEM).

The reactivity of the polyols was studied by reaction with phenyl isocyanate in diglyme (2-methoxyethyl ether) at 70° C. The reaction was carried out in a 250 mL three-necked flask, which was immersed in a constant temperature bath and equipped with a magnetic stirrer, thermometer, reflux condenser, and a nitrogen inlet. A solution of the hydroxyl component in diglyme (0.18N) containing catalyst (if used) in a 50 mL volumetric flask was introduced into the reaction flask and thermostated at the reaction temperature. A thermostated solution of phenyl isocyanate (0.18N, 50 mL) was added into the reactor through a dropping funnel. The time when half of the solution had been added was taken as the starting point of the reaction. Constant stirring and flow of nitrogen were maintained during the reaction. Samples of the reaction solutions (about 1 g) were taken at specified time intervals and the isocyanate content determined by the di-n-butylamine method (ASTM D-1638-74). When the reaction was completed (0% NCO content), a sample was taken for infrared analysis. A small quantity of the liquid reaction mixture was spread over a KBr plate and dried in a vacuum oven. The infrared analysis spectra were recorded using a Nicolet 5MX spectrometer.

The viscosity of DIFOL diols was found to increase with molecular weight. The viscosity of DIFOL of Mn 6000 (i.e., DIFOL 6000) was found to be ten times higher than that of DIFOL 2000 (Table 2). However, the viscosity of DIFOL 2000 was lower than that of Poly-bd-R-45 HT polyol and PTMO 2000. The latter is a solid at room temperature (25° C.).

The compatibility of DIFOL diols with different chain extenders was found to depend on the composition of the chain extender; a mixture of DIFOL 2000 (5 pbw) with 1,4-butanediol (0.22 pbw) was hazy. Poly-bd R-45 HT polyol had similar compatibility to that of DIFOL 2000 diol. In contrast, PTMO 2000 gave clear solutions with 1,4-butanediol at the same concentrations.

DIFOL 2000 and DIFOL 3000 were found to be compatible with PTMO 2000 and PPG 2010 in 50:50 mixtures at room temperature (25° C.).

The following examples illustrate the preparation, properties and application of the polyurethane elastomers of the instant invention, but are not presented to limit the scope of the invention. Details as to formulations and properties are in Tables 3, 4, 5 and 6.

EXAMPLE 1

A series of thermoplastic polyurethane elastomers was prepared utilizing the one-shot method at 20–23% hard segment concentration from MDI, 1,4-butanediol and three polyols: polybutadiene diol DIFOL 2000, polybutadiene Poly-bd R-45 HT, and poly (oxytetramethylene)glycol PTMO 2000 (E. I. DuPont de Nemours & Co., Inc., (DuPont) Wilmington, Del.). Although they were prepared under the same conditions, the Poly-bd elastomer is not a true thermoplastic system because the polyol functionality is greater than two. The formulations, as well as thermal and mechanical properties, are given in Tables 3 and 4.

TABLE 3

TPU Elastomer Formulations

| Polyol | DIFOL 2000 | Poly-bd | PTMO 2000 | Tone 0240 |
|---|---|---|---|---|
| Formulation | | | | |
| Hard Segment Concentration (%) | 20 | 22 | 23 | 23 |
| Polyol (g) | 25.55 | 40.00 | 40.00 | 40.00 |
| 1,4-BD (g) | 0.96 | 2.41 | 1.77 | 1.77 |
| MDI (g) | 5.46 | 9.26 | 10.00 | 10 |
| Cyanox 2246 (g) | 0.10 | 0.10 | 0.00 | 0.00 |
| Isocyanate Index | 102 | 102 | 102 | 102 |

TABLE 4

TPU Elastomer Properties, Dry, As Molded, and After Humid Aging
(Conditions: 7 days immersion at 100° C.)

| | Polyol | | | | | | |
|---|---|---|---|---|---|---|---|
| | DIFOL 2000 | | Poly-bd | | PTMO 2000 | | Tone 0240 |
| | Dry, as molded | After 7 days at 100° C. | Dry, as molded | After 7 days at 100° C. | Dry, as molded | After 7 days at 100° C. | Dry, as molded |
| Properties | | | | | | | |
| Hardness (Shore A) | 80 | 75 | 72 | 69 | 74 | 62 | 73 |
| Tg (°C.) by DSC | −85 | | −75 | | −70 | | −41 |
| Ultimate Tensile Strength, psi (MPa) | 1700 (11.7) | 1380 (9.5) | 390 (2.7) | 310 (2.1) | 3000 (20.7) | 420 (2.9) | 4200 (29.0) |
| Elongation at Break (%) | 1280 | 1210 | | | 1220 | | 1200 |
| Tensile Modulus at 100% Elongation, psi (MPa) | 380 (2.6) | | 260 (1.8) | | 300 (2.1) | | |
| Tear Strength (pli) | | | | | | | |
| Die C Tear | 300 | 240 | 70 | 55 | 310 | 125 | |
| Split Tear | 125 | | 8 | | 130 | | |
| Rebound % | 51 | | 28 | | 55 | | |
| Taber Abrasion mg/1000 cycles (pres.) | 17 (500 g) | | 38 (250 g) | | 1 (500 g) | | |
| Compression Set (%) | | | | | | | |
| at 22° C. | 11 | | | | 18 | | |
| at 70° C. | 56 | | | | 25 | | |
| Weight Gain (%) | | 0.1 | | 0.2 | | 2.1 | |

A representative procedure is provided for the synthesis of a DIFOL-based elastomer: DIFOL 2000 (25.55 g, 0.0437 OH equiv.) and 1,4-butanediol (0.96 g, 0.0426 OH equiv.), previously preheated at 70° C. were weighed in a 250 mL plastic cup and mixed using a high speed laboratory mixer for 2 min. The cup was covered with aluminum foil and placed in an oven at 80° C. for 10–15 min. Antioxidant Cyanox 2246 (0.1 g) (Cytec Industries, West Patterson, N.J.) was then added and mixed for 1 min., followed by the addition of MDI (5.46 g, 0.0874 NCO equiv.), which was previously melted at 60°–70° C. After adding the isocyanate, all components were mixed for an additional 1 min. The mixture was then poured into a Teflon®-coated mold, which was preheated at 105° C., and placed in a Carver press. When gelation occurred (as determined by string formation), the resin was compression-molded at 20,000 psi in a Carver press at 105° C. for 1 hour. Afterwards, the polyurethane sheet was post-cured in an oven at 105° C. for 16 hours.

The elastomer based on DIFOL 2000 exhibited an extended low temperature flexibility range based on the glass transition temperatures measure by DSC. The Tg (−85° C.) for the soft segment of elastomers based on DIFOL 2000 was lower than that for elastomers based on Poly-bd R-45 HT (Tg=−75° C.), and PTMO 2000 (Tg=−70° C.). Melting transitions for the hard segment domains were detected at 169° C. and 148° C. for the DIFOL and PTMO elastomers, respectively, and are indicative of good phase separation in these segmented polymers. Phase separation was confirmed by scanning electron microscopy (SEM).

The softening temperature of the polyurethane elastomers is a function of the hard segment composition and the degree of phase separation. The softening temperature of the DIFOL 2000-based elastomer, as measured by TMA, was slightly higher than that of a PTMO 2000 elastomer and a Poly-bd elastomer. The TMA measurements, together with the low temperature Tg for the soft segment, indicate that TPU elastomers from DIFOL 2000 have a broader application temperature range than Poly-bd or PTMO-based elastomers.

The dry, as-molded physical-mechanical properties for the DIFOL system exceeded the performance of the Poly-bd, and were comparable to PTMO. Tensile strength values for the DIFOL elastomers were typically about 1700 psi, versus about 400 psi and 3000 psi for the Poly-bd and PTMO systems, respectively. In contrast, however, the modulus values at 100% elongation showed higher values for DIFOL (380 psi) versus PTMO (300 psi). The elongation-at-break of DIFOL (1280%) also exceeded those for Poly-bd (190%) and for PTMO (1220%). The tear resistance (Grave die C and Split tear) of the polyurethane elastomers showed better performance for both DIFOL and PTMO versus Poly-bd, as expected from their higher tensile strengths. Details are in Table 4.

The TPU polyurethane elastomers based on DIFOL 2000 exhibited very good resilience as measured by ball rebound (51), which was slightly lower than that of PTMO 2000-based elastomers (55). Similarly, the compression set of DIFOL 2000-based elastomers at room temperature was low (11%), compared with that of PTMO 2000-based elastomers (18%). However, at 70° C., compression set was higher for the DIFOL 2000 based elastomer (56%) than for the PTMO 2000 system (25%).

The abrasion resistance of DIFOL 2000 based elastomers was better than that of Poly-bd R-45 HT, but not quite as high as for PTMO-based elastomers. Under relatively severe testing conditions (H-18 abrasive wheel, 500 g of pressure, 2000 test cycles) the wear index (mg/1000 cycles) was as follows: PTMO 2000 (1), DIFOL 2000 (17). See Table 4 for details.

EXAMPLE 2

Cast polyurethane elastomers were prepared utilizing a two-step procedure. In the first step, the NCO-terminated prepolymer was prepared by reacting toluene diisocyanate (TD-80) and polyol at an NCO/OH equivalent ratio of 2/1. The following polyols were utilized in the prepolymer preparation: polybutadiene diols DIFOL 2000, poly(oxytetramethylene)glycol PTMO 2000 (DuPont) and poly(oxypropylene)glycol PPG 2010 (BASF, Parsippany, N.J.). In the second step, the NCO-terminated TDI-based prepolymer was chain-extended with Curene 442 [4,4'-methylene bis(2-chloroaniline)] (Anderson Development Co., Adrian, Mich.). Poly(urethane-urea) sheets, free of bubbles, were prepared by compression molding the reactive resin mixture at 105° C. The formulations and physical-mechanical properties of the cast polyurethane elastomers are shown in Tables 5 and 6.

TABLE 5

Cast Elastomers Formulations

| Polyol | DIFOL 2000 | PTMO 2000 | PPG 2010 |
|---|---|---|---|
| Formulation | | | |
| Hard Segment Concentration (%) | 22 | 23 | 23 |
| NCO-Terminated Prepolymer (NCO/OH = 2/1) | 90.0 g DIFOL 15.1 g TDI | 180.0 g PTMO 31.3 g TDI | 286.8 g PPG 50.0 g TDI |
| Prepolymer used (g) | 27.00 | 27.00 | 28.00 |
| MBCA (g) | 2.83 | 2.92 | 3.04 |
| Cyanox 2246 (g) | 0.09 | 0.00 | 0.00 |
| Isocyanate Index | 105 | 105 | 105 |

TABLE 6

Cast Elastomer Properties, Dry, As Molded, and After Humid Aging
(Conditions: 7 days immersion at 100° C.)

| | Polyol | | | | | |
|---|---|---|---|---|---|---|
| | DIFOL 2000 | | PTMO 2000 | | PPG 2010 | |
| | Dry, as molded | After 7 days at 100° C. | Dry, as molded | Dry, as molded | After 7 days at 100° C. | Dry, as molded |
| Properties | | | | | | |
| Hardness | | | | | | |
| (Shore A) | 91 | 89 | 89 | 78 | 86 | 66 |
| (Shore D) | 48 | | 46 | | 41 | |
| Tg (°C.) by DSC | −85 | | −66 | | −44 | |
| Ultimate Tensile Strength, psi (MPa) | 1740 (12.0) | 1780 (12.3) | 5410 (37.3) | 310 (2.1) | 1360 (9.4) | 90 (0.6) |
| Elongation at Break | 310 | 500 | 450 | 110 | 700 | 20 |
| Tensile Modulus at 100% Elongation, psi (MPa) | 1090 (7.5) | | 860 (5.9) | | 590 (4.1) | |
| Tear Strength (pli) | | | | | | |
| Die C Tear | 330 | 400 | 470 | 90 | 270 | 20 |
| Split Tear | 100 | | | | 100 | |
| Rebound (%) | 49 | | 50 | | 35 | |
| Taber Abrasion (mg/2000 cycles, 1000 g) | 35 | | 4 | | 60 | |
| Compression Set (%) | | | | | | |
| at 22° C. | 4 | | 5 | | 14 | |
| at 70° C. | 30 | | 33 | | 40 | |
| Weight Gain (%)** | | 0.2** | | 0.4** | | 1.6** |

**After immersion for seven days at 70° C.

The preparation of a DIFOL-based cast elastomer at 28% hard segment concentration was as follows: In the first step, a urethane prepolymer at an NCO/OH ratio of 2/1 was prepared. Toluene diisocyanate (14.75 g, 0.169 NCO equiv.) was placed in a 0.5 L glass reaction kettle, which was equipped with a stirrer and a nitrogen inlet and outlet. A continuous flow of nitrogen was maintained. The reactor was heated with a heating mantle. When the temperature of the isocyanate reached 70° C., 100.0 g (0.084 OH equiv.) of the DIFOL 2000 was added in several portions to the reactor under constant mixing. The reaction temperature was maintained at 75° C. and periodic samples were withdrawn to determine the isocyanate content. After the NCO value reached 3.3% (theoretical value 3.1%)in about 1.5 hours, the reaction was cooled to 25° C. The prepolymer was stored in a 120 mL glass bottle under nitrogen. In the second step, the glass bottle with the prepolymer was heated at 70° C. under nitrogen and 14.3 g (0.011 NCO equiv.) of prepolymer were weighed into a 250-mL plastic cup. Toluene diisocyanate (0.46 g, 0.005 NCO equiv.) was added to the prepolymer which was then mixed for 1 min. This isocyanate resin-quasi prepolymer had an NCO/OH ratio of 2.5/1. The antioxidant Cyanox 2246 (0.1 g) was then added to the isocyanate and mixed for 1 min. The chain extender, 4,4'-methylene bis(2-chloroaniline), 2.01 g (0.015 $NH_2$ equiv.) which was melted at 110° C., was added to the prepolymer under vigorous mixing (30–40 seconds). The mixture was then poured into a mold covered with Teflon® sheets and placed in a Carver press until gelation occurred. At the gel point (5–6 mins. ), the mold was compressed to 20,000 psi for 1 hour at 105°

C. The sheets were then placed in an oven at 100° C. for 16 hours for post-curing.

EXAMPLE 3

The moisture uptake of TPU elastomers based on DIFOL 2000 diol and commercial polyols (Poly-bd R-45 HT, PTMO 2000, TONE 0240) was determined by the weight change after immersion in water at 100° C. for seven days. Under these conditions, the elastomers based on the two hydrocarbon polyols, DIFOL 2000 and Poly-bd, showed lower water uptake (less than 0.5 wt %) than the elastomers based on PTMO or TONE 0240 polyols (1–2 wt %). See Table 4.

The study of the water resistance of TPU elastomers was extended to the effect of humid aging on the properties of polyurethane elastomers. The humid aging testing was carried out under relatively severe conditions (immersion in water at 100° C. for seven days). The change in hardness, tensile strength, elongation at break, and resilience (ball rebound) was monitored, as well as water uptake. After immersion, the PTMO-based elastomers became swollen and lost 86% of the original tensile strength. Even after these samples were degassed at 70° C. under vacuum, the tensile strength recovered to only one-third of the original value which may be an indication of the irreversible degradation of the polymer backbone. In contrast, the DIFOL 2000 and Poly-bd elastomers lost only about 20% of the original tensile strength after humid aging. The changes in hardness, tensile strength, elongation, and tear strength are represented in Table 4. The negative change in physical properties after exposure correlates with the amount of moisture absorbed by the polymer.

EXAMPLE 4

The retention of properties after thermal aging at 100° C. for seven days for DIFOL 2000-based TPU elastomers containing antioxidant was determined. Under these conditions, a DIFOL sample retained 89% of its original tensile strength versus only 77% for a PTMO elastomer.

EXAMPLE 5

The physical-mechanical properties of the DIFOL 2000-based cast elastomers were evaluated and compared to those of PPG 2010 and PTMO-based cast elastomers. The tensile properties (tensile strength, modulus) of DIFOL 2000-based elastomers were higher than those of PPG 2010 elastomers. The tensile strength of a DIFOL 2000 elastomer was 1740 psi and that of a PPG 2010 based elastomer was 1360 psi. The tensile strength of DIFOL 2000 increased with increase in the hard segment concentration from 22% (tensile strength=1740 psi) to 28% (tensile strength=2005 psi). The hardness of DIFOL 2000-based elastomer (91 Shore A) was somewhat higher than that of PPG 2010-based elastomers (86 Shore A) at very similar hard segment concentration 22% and 23%, respectively).

DIFOL cast elastomers exhibited a low glass transition temperature by DSC (−85° C.) which was significantly lower than that of PPG 2010 elastomers (−44° C.) and the PTMO 2000-based elastomers (−66° C.). The phase transitions of cast elastomers at low temperatures were confirmed by dynamic-mechanical analysis (DMA), however, the tan delta values were shifted to somewhat higher temperatures than the values measured by DSC. The following values were obtained: −77° C. for DIFOL 2000; −29° C. for PPG 2210; and −48° C. for PTMO 2000. These low temperature transitions can be considered as limiting in applications where low temperature flexibility must be maintained.

The softening temperature of the cast polyurethane elastomers is a function of the hard segment composition and the degree of phase separation. The softening temperature of the DIFOL 2000-based elastomer as measured by TMA was 237° C., which was slightly higher than that of a PTMO 2000 elastomer (229° C.) and the PPG 2010 elastomer (208° C.). The TMA measurements, together with the low temperature Tg for the soft segment, indicate that cast elastomers from DIFOL 2000 have a broader application temperature range than PPG 2010 or PTMO-based elastomers.

The compression set of DIFOL 2000 cast elastomers was lower than for PPG 2010-based elastomers and about the same as for PTMO 2000. At 22° C., the set was only 4% for DIFOL versus 14% and 5% for PPG 2010 and PTMO 2000 elastomers, respectively. As expected, the compression set increased with temperature. At 70° C., the compression set of a DIFOL 2000 elastomer was 30% versus 40% for PPG 2010 and 33% for PTMO 2000.

The coefficient of linear thermal expansion of cast elastomers was measured by thermo-mechanical analysis. The coefficient of linear thermal expansion of PPG 2010 and PTMO 2000-based elastomers was lower than that of DIFOL 2000-based elastomers.

The abrasion resistance of cast polyurethane elastomers was found to depend on the type of polyol (Table 6). DIFOL 2000-based cast elastomers exhibited better abrasion resistance (Taber Wear Index=35) than PPG 2010-based cast elastomers (Taber Wear Index=57). PTMO 2000-based cast elastomers exhibited a very low degree of abrasion (Taber Wear Index=4).

EXAMPLE 6

The moisture uptake of cast polyurethane elastomers based on DIFOL 2000 and commercial polyols PTMO 2000 and PPG 2010 was determined by measuring the weight change after immersion in water at 70° C. The DIFOL 2000 elastomers exhibited very low water uptake, only 0.2 wt % versus 0.4 wt % for PTMO 2000 and 1.6 wt % for PPG 2010. See Table 6 for details.

The study was extended to measurement of retention of physical-mechanical properties after immersion in water for seven days at 100° C. The changes in hardness, tensile strength, elongation, and tear strength are represented in Table 6. The negative change in physical properties after exposure correlates with the amount of moisture absorbed by the polymer. In this evaluation, the DIFOL 2000-based elastomers exhibited excellent resistance and there was very little deterioration in properties. However, the elastomers based on PTMO 2000 and PPG 2010 underwent severe degradation. The tensile strength, tear strength, and elongation of PPG 2010-based elastomers decreased to less than 10% of their original values. The relatively high original tensile strength of PTMO 2000-based elastomers (5400 psi) decreased by 93% (to 390 psi) after swelling. These results were in agreement with the study of hydrophobicity of the thermoplastic elastomers.

EXAMPLE 7

The oxidative stability of cast polyurethane elastomers was evaluated by measurement of retention of a limited set of physical-mechanical properties (tensile strength, elongation, hardness) after exposure at 100° C. for seven days in air. The cast elastomers based on DIFOL 2000 and PTMO 2000 exhibited excellent resistance to oxidation under these conditions. However, the tensile strength of the cast elastomer based on PPG 2010 decreased by 16%.

What is claimed is:

1. A hydrophobic polyurethane elastomer composition containing a linear soft segment without pendant chain branched groups, wherein said polyurethane elastomer has a glass transition temperature (Tg) of less than −70° C. and a moisture uptake of less than 1.0 wt % after 24 hours of immersion in water at 70° C., and wherein said polyurethane elastomer comprises at least one repeat unit containing said linear soft segment, which soft segment comprises a moiety derived from a polyol of the structure:

$$X\text{—}[CH\text{=}CH(CH_2)_n]_m CH\text{=}CH\text{—}X$$

wherein X is a hydroxyl-containing moiety selected from the group consisting of —CH$_2$OH, —(CH$_2$)$_8$COO(CH$_2$)$_p$OH and —COO(CH$_2$)$_p$OH, wherein the functionality number of the terminal groups is 2.0, p is 2 to 12, n is 1 to 10, m is a number average value of up to 1000, and the weight of said polyol is from about 0.5 wt. % to about 99.5 wt. % of said polyurethane elastomer, and the said polyurethane comprises the reaction product of:

(i) the said polyol; and (ii) an isocyanate having a functionality of at least b 2; and (iii) a chain extender selected from the group consisting of monomeric diols of from 2 to 20 carbon atoms and amines of from 2 to 20 carbon atoms.

2. The hydrophobic polyurethane elastomer composition of claim 1 wherein said polyol is 1,4-polybutadiene diol, said isocyanate is 4,4'-methylene bis(phenyl)isocyanate (MDI) and said chain extender is 1,4-butanediol.

3. The polyol of claim 1 wherein n=2 and the polyol is a 1,4-polybutadiene diol.

4. The polyol of claim 1 wherein n=3 and the polyol is a poly(1-pentenylene)diol.

5. The polyol of claim 1 wherein n=4 and the polyol is a poly(1-hexenylene)diol.

6. The polyol of claim 1 wherein n=6 and the polyol is a poly(1-octenylene)diol.

7. The polyol of claim 1 wherein n=8 and the polyol is a poly(1-decenylene)diol.

8. The polyol of claim 1 wherein n=10 and the polyol is a poly(1-dodecenylene)diol.

9. The hydrophobic polyurethane composition of claim 1 wherein said polyurethane composition comprises the reaction product of at least two polyols, of which at least one polyol is said polyol of claim 1 and at least one polyol is selected from the group consisting of poly(oxypropylene)glycol, poly(oxyethylene)glycol, poly(oxypropylene-oxyethylene)glycol, poly(oxytetramethylene)glycol, poly(oxybutylene)glycol, poly(caprolactone)glycol, poly(ethyleneadipate)glycol, poly(butyleneadipate)glycol, aromatic polyester glycols, polybutadiene polyol, hydrogenated polybutadiene polyol, polyisoprene polyol, hydrogenated polyisoprene polyol, and mixtures thereof.

10. The hydrophobic polyurethane elastomer composition of claim 1 wherein said chain extender is selected from the group consisting of 1,4-butanediol, 1,6-hexanediol, ethylene glycol, dimethylolpropionic acid, hydroquinone dihydroxyethyl ether (HQEE), diethylene glycol, propylene glycol, trimethylolpropane, glycerol, diethyltoluenediamine (DETDA), 4,4'-methylene bis(2-chloroaniline) (MBCA), ethylenediamine (EDA), dimethylthiotoluene-diamine (DMTTDA), 4,4'-methylenedianiline (MDA), complex of methylenediamine with NaCl (MDA complex), trimethyleneglycol di-p-aminobenzoate (TMGDAB), 4,4'-methylenebis(3-chloro-2,6-diethylaniline) (M-CDEA), and N,N'-bis-(sec-butyl)methylene-dianiline (SBMDA), and mixtures thereof.

11. The hydrophobic polyurethane elastomer composition of claim 1 wherein said isocyanate is selected from the group consisting of 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, and mixtures thereof.

* * * * *

UNITED STATES PATENT AND TRADEMARK OFFICE
CERTIFICATE OF CORRECTION

PATENT NO. : 5,589,543
DATED : December 31, 1996
INVENTOR(S) : Howard B. Yokelson, Philip O. Nubel, Raymond T. Behrends It is certified that error appears in the above-indentified patent and that said Letters Patent is hereby corrected as shown below:

| Col. | Line | |
|---|---|---|
| 5 | 63 | "$-(CH_2)_8COO(CH_2)_6-OH.$" should read -- $-(CH_2)_8COO(CH_2)_6-OH.$ -- |
| 14 | 16 | "Elongation at Break" should read --Elongation at Break (%)-- |
| 17 | 26 | "(ii) an isocyanate having a functionality of at least b2;" should read --(ii) an isocyanate having a functionality of at least 2;-- |

Signed and Sealed this

Fifteenth Day of July, 1997

Attest:

*Attesting Officer*

BRUCE LEHMAN

*Commissioner of Patents and Trademarks*